(No Model.)
F. STANKE.
MOLE AND GOPHER TRAP.
No. 339,707. Patented Apr. 13, 1886.
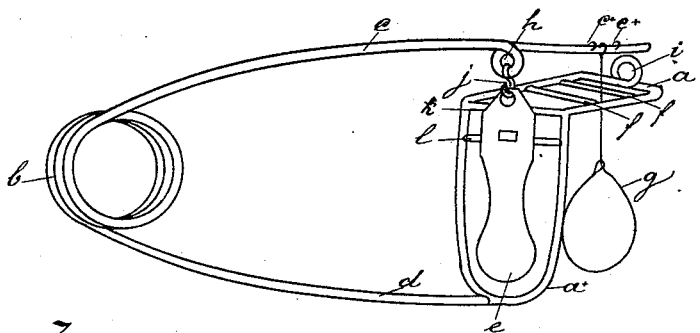
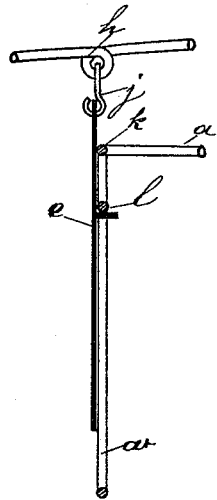
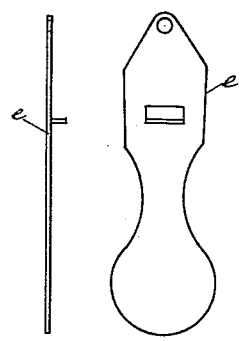
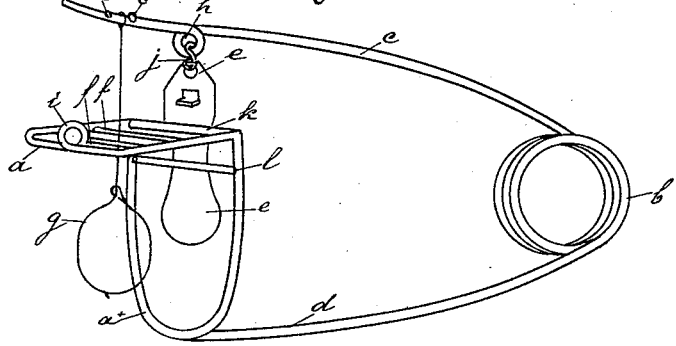
Witnesses:
S. A. Owen.
J. H. Hitchins
Inventor:
Florian Stanke
By his Att'y,
Alphonso B. Smith
N. PETERS. Photo-Lithographer, Washington, D. C.

UNITED STATES PATENT OFFICE.

FLORIAN STANKE, OF SAN FRANCISCO, CALIFORNIA.

MOLE AND GOPHER TRAP.

SPECIFICATION forming part of Letters Patent No. 339,707, dated April 13, 1886.

Application filed August 11, 1885. Serial No. 174,159. (No model.)

*To all whom it may concern:*

Be it known that I, FLORIAN STANKE, a resident of the city and county of San Francisco, in the State of California, have invented a new and useful Mole and Gopher Trap; and I hereby declare that the following is a full, clear, and exact description of the same, reference being had to the accompanying drawings.

My invention relates to a device for entrapping and killing moles, gophers, or other animals.

The following description fully explains the nature of my said invention and the manner in which I proceed to construct, apply, and use the same, the accompanying drawings being referred to by figures and letters.

Figure 1 is a perspective view of the trap, looking at it from the rear, showing the catch set and the noose open. Fig. 2 is a perspective view of the trap, looking at it from the front, showing the catch sprung and the arm of the spring holding the noose in the act of flying up. Fig. 3 shows two views of the catch. Fig. 4 is an enlarged detail section view of part of the frame and part of the arm, showing the catch and its attachment.

In constructing my trap for moles and gophers I make a frame of suitable wire bent at a right angle near the center, the upper or horizontal part, $a$, being nearly square with curved corners, and the lower vertical part, $a^x$, terminating in an oval form. In the center of the front part of the frame the wire forms a loop, $i$, for the tip of the arm to catch in and rest when the trap is not in use. Cross-wires $ff$ are placed centrally on the horizontal square part of the frame, and at the head of the vertical part there is a cross-wire, $k$, and a short distance below it another cross-wire, $l$. Attached to the bottom of the oval of the vertical part of the frame is the foot, $d$, of the steel spring, $b$, which projects backward, and after several coils projects forward to the horizontal square part of the frame, where it forms a loop, $h$, and then forward to the end of the frame, where its tip has an upward curve. Near the end of the arm there are two small semi-collars, $c^x$, between which the noose is fastened, and which prevent it from sliding or slipping off the arm. The noose $g$ is made of small ductile wire, and is suspended from the arm of the spring between the central cross-wires, $ff$. A catch, $e$, made of a plate of thin metal having a lip cut in its upper part is attached to a hook, $j$, suspended from the loop $h$ in the arm of the spring in the rear of the frame and close to the vertical part.

In setting the trap to catch moles, gophers, squirrels, rats, or mice, a cut is made with a knife or a trowel in the infested ground to about the depth of the vertical part of the frame $a^x$, which, with the noose $g$, is inserted in the cut, the square horizontal part of the frame $a$ resting on the surface of the ground. The foot $d$ and coils $b$ of the spring may also be set in the ground or covered lightly with earth. The noose having been let into the ground, the tip of the arm $c$ of the spring is disengaged from the loop $i$ in the frame, the lip of the catch $e$ is placed under the cross-wire $l$, and the trap is set. As soon as the animal passes its head and shoulders through the noose and touches the catch the lower part of the catch is thrown outward. As the upper cross-wire, $k$, prevents the head of the catch from inclining inward, the lip on the catch is thrown from under the cross-wire $l$, and the arm bounds upward and draws the noose tightly around the body of the entrapped animal. The central cross-wires, $ff$, against which the animal is jerked by the recoil of the spring, prevent it from being drawn through the frame. In setting the trap it may be attached by wire or cord to a stake driven into the ground.

Having thus fully described my invention, what I claim, and desire to secure by Letters Patent, is—

A mole or gopher trap consisting of a wire frame, as described, having cross-wires $ffkl$, and a loop, $i$, for the purposes set forth, in combination with a coiled steel spring, $b$, having a foot, $d$, attached to the frame, and an arm, $c$, with a loop, $h$, and semi-collar $c^x$, a catch, $e$, with a lip for catching under cross-wire $l$, and a noose, $g$, attached to arm $c$, substantially as hereinbefore described, and for the purposes set forth.

In testimony whereof I have hereunto set my hand and seal.

FLORIAN STANKE. [L. S.]

Witnesses:
  A. B. SMITH,
  JNO. DUGAN, Jr.